(12) United States Patent
Inoue et al.

(10) Patent No.: US 6,304,950 B1
(45) Date of Patent: Oct. 16, 2001

(54) MICROPROCESSOR HAVING ROM AREAS EMULATED BY RAM AREAS

(75) Inventors: Hideo Inoue; Tetsu Tashiro; Toshio Sunami, all of Tokyo (JP)

(73) Assignees: Mitsubishi Electric Semiconductor System Corporation; Mitsubishi Denki Kabushiki Kaisha, both of Tokyo (JP)

(*) Notice: Subject to any disclaimer, the term of this patent is extended or adjusted under 35 U.S.C. 154(b) by 0 days.

(21) Appl. No.: 09/293,849

(22) Filed: Apr. 19, 1999

(30) Foreign Application Priority Data

Dec. 16, 1998 (JP) .................................................. 10-358087

(51) Int. Cl.$^7$ ...................................................... G06F 12/02
(52) U.S. Cl. ........................ 711/170; 711/102; 711/104; 711/173; 703/24
(58) Field of Search ..................................... 711/102, 104, 711/170, 172, 173, 202; 703/24

(56) References Cited

U.S. PATENT DOCUMENTS 5,826,059 * 10/1998 Harada et al. ..................... 395/500
6,075,941 * 6/2000 Itoh et al. ........................... 395/704

FOREIGN PATENT DOCUMENTS

| 62251934 | 11/1987 | (JP) . |
| 6484341 | 3/1989 | (JP) . |
| 7302254 | 11/1995 | (JP) . |

* cited by examiner

*Primary Examiner*—Hiep T. Nguyen
(74) *Attorney, Agent, or Firm*—Leydig, Voit & Mayer, Ltd.

(57) ABSTRACT

A microcomputer includes a read only memory (ROM) with ROM areas in a built-in ROM for emulation by a random access memory (RAM) for fine tuning a program to be written into the ROM. The microcomputer further includes RAM areas in a built-in RAM and an assigning unit for assigning at least one RAM area to each of the ROM areas. In the emulation mode, each of the ROM areas can be replaced with a corresponding RAM area.

6 Claims, 7 Drawing Sheets

MICROPROCESSOR HAVING ROM AREAS EMULATED BY RAM AREAS

BACKGROUND OF THE INVENTION

1. Field of the Invention

The present invention relates to a microcomputer having a ROM emulation function used for debugging software.

2. Description of the Prior Art

Figure 10:
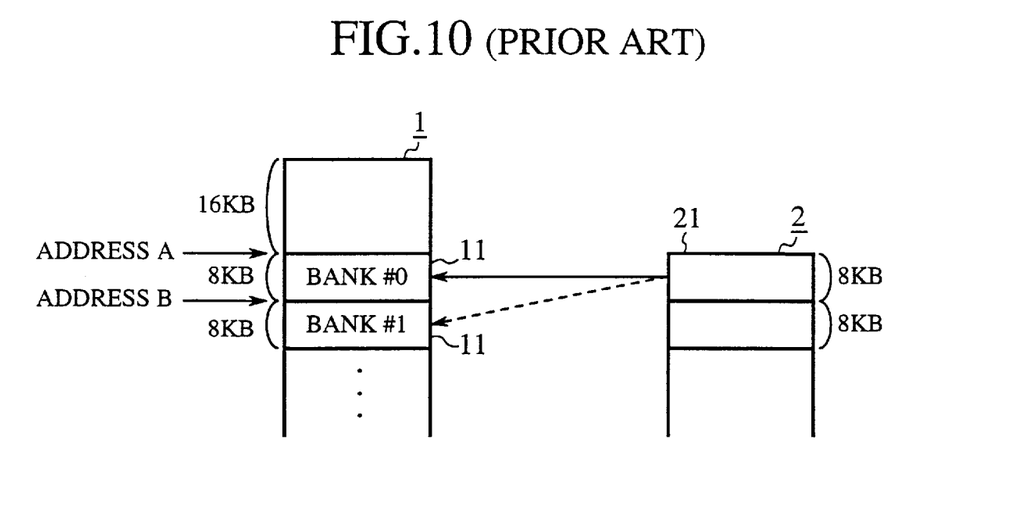
FIG. 10 is a diagram showing a concept underlying a prior art microcomputer.

Referring now to FIG. 10, there is illustrated a diagram showing a concept underlying a prior art microcomputer as disclosed in, for example, "Mitsubishi 32-bit RISC single-chip microcomputer M32R family M32R/E series 32160 group M32160F3UFP M32160F4UFP User Manual", pp.5–37 to 5–39, Mitsubishi Electric Corp. and Mitsubishi Semiconductor System Corp., Aug. 20, 1998. In the figure, reference numeral 1 denotes a read-only-memory or ROM, 2 denotes a random-access-memory or RAM, 11 denotes each of a plurality of ROM areas into which the ROM 1 is divided, each ROM area having a predetermined size, e.g., 8Kbytes as shown in the figure, and 21 denotes a first RAM area in the RAM 2 having a predetermined size, e.g., 8Kbytes as shown in the figure, which is the same as that of each ROM area 11. Each ROM area 11 includes a starting address specifying the memory location of its top, such as address A, B, or the like as shown in FIG. 10.

In operation, when changing the current mode into ROM simulation mode, the starting address specifying the ROM area 11 that is to be replaced with the first RAM area 21, for example, the address A is set, and "1" is written into an emulation mode bit of a control register not shown. When the emulation mode bit is set to "1", the ROM area 11 whose starting address has been specified, in this case, whose starting address is the address A, can be replaced with the first 8KB RAM area 21. Therefore, when the ROM area 11 whose address has been selected in the ROM emulation mode, in this case, is the address A, is accessed by something, the first RAM area 21 on the RAM 2 is actually accessed.

When performing an emulation operation on another ROM area 11, for example, the next ROM area 11 whose starting address is the address B, the same process is carried out by setting another address specifying the memory location of the top of the other ROM area, for example, the address B. The ROM area 11 whose starting address has been specified, for example, whose starting address is the address B, is replaced with the first 8KB RAM area 21. Therefore, when the ROM area 11 whose address has been specified in the ROM emulation mode is accessed by something, for example, when the ROM area 11 with the starting address B is accessed by something, the first RAM area 21 in the RAM 2 is actually accessed. In this manner, an application that needs to change data while it is running can dynamically change the data using the first RAM area 21 on the RAM 2.

Japanese Patent Application publications (KOKAI) No. 62-251934, No. 64-84341, No. 7-302254, and No. 6-139102 disclose a prior art technique that relates to a microcomputer having such a ROM emulation function, for example.

A problem with such a prior art microcomputer so constructed as mentioned above is that since one of the plurality of ROM area 11 in the ROM 1 is securely replaced with a predetermined RAM area 21 in the RAM 2 in the emulation mode, the memory map of part of the RAM in which the program that is debugged and tuned in the emulation mode is stored differs from that of corresponding part of the ROM in which the program is actually stored, and therefore, the whole of the program needs to be reconfigured (or rewritten) after the tuning is complete.

SUMMARY OF THE INVENTION

The present invention is made to overcome the above problem. It is therefore an object of the present invention to provide a microcomputer capable of finely tuning any program on a ROM without having to reconfigure the whole of the program after the tuning is complete.

In accordance with one aspect of the present invention, there is provided a microcomputer including a ROM and a RAM built therein, comprising: a plurality of ROM areas formed on the ROM, on each of which emulation can be performed; a plurality of RAM areas formed on the RAM; an assigning unit for assigning at least one RAM area to each of the plurality of ROM areas; and a replacing unit for replacing each of the plurality of ROM areas with a corresponding RAM area assigned to each of the plurality of ROM areas.

In accordance with a preferred embodiment of the present invention, the plurality of ROM areas on each of which emulation can be performed are equal in size (or storage amount), and the plurality of RAM areas that can be respectively replaced with the plurality of ROM areas have the same size as the plurality of ROM areas.

In accordance with another preferred embodiment of the present invention, the assigning unit includes a plurality of ROM area specification registers respectively associated with the plurality of RAM areas on the RAM, each for specifying one ROM area that is to be replaced with a corresponding RAM area associated with each of the plurality of ROM area specification registers. In addition, the replacing unit can replace one ROM area, which is specified by each of the plurality of ROM area specification registers, with a corresponding one of the plurality of RAM areas on the RAM that is associated with each of the plurality of ROM area specification registers.

In accordance with another preferred embodiment of the present invention, each of the plurality of ROM area specification registers includes a ROM area specification section for specifying one ROM area that is to be replaced with a corresponding one of the plurality of RAM areas on the RAM that is associated with each of the plurality of ROM area specification registers, and an enable bit for enabling or disabling replacement of the ROM area specified by the ROM area specifying section with the corresponding RAM area.

In accordance with another preferred embodiment of the present invention, the microcomputer further comprises a plurality of switches respectively associated with the plurality of RAM areas, each for connecting or disconnecting a corresponding one of the plurality of RAM areas with or from one ROM area associated with the corresponding RAM area, according to a control signal applied to an external terminal. Each of the plurality of switches is closed or opened to enable or disable replacement of one ROM area with a corresponding one of the plurality of RAM areas associated with each of the plurality of switches.

In accordance with another preferred embodiment of the present invention, each of the plurality of ROM areas has an arbitrary size and a corresponding one of the plurality of RAM areas that is to be replaced with each of the plurality of ROM areas has the same size as each of the plurality of ROM areas. In addition, the assigning unit includes a plurality of ROM area specification registers respectively associated with the plurality of RAM areas on the RAM, each for storing a starting address and an ending address for specifying one ROM area that is to be replaced with each of the plurality of RAM areas associated with each of the plurality of ROM area specification register.

In accordance with another preferred embodiment of the present invention, the microcomputer further comprises a selection unit for, when the assigning unit sets information indicating an identical ROM area to two or more ones of the plurality of ROM area specification registers, selecting one RAM area from among two or more RAM areas associated with the two or more ROM area specification registers specifying the same ROM area according to priorities assigned to the two or more RAM areas, and a switching unit for connecting only the selected RAM area with the identical ROM area so as to enable replacement of the identical ROM area with the selected RAM area.

In accordance with another preferred embodiment of the present invention, the microcomputer further comprises an emulation mode enable register for storing information for enabling or disabling an overall emulation function using the RAM, a gate array for passing the contents of the enable bit of each of the plurality of ROM area specification registers only when the information stored in the emulation mode enable register indicates that the overall emulation function is enabled, and a plurality of enable switches respectively associated with the plurality of RAM areas, each for connecting or disconnecting a corresponding one of the plurality of RAM areas with or from one ROM area associated with the corresponding RAM area, according to a output signal applied thereto from the gate array.

In accordance with another preferred embodiment of the present invention, when the assigning unit sets information indicating an identical ROM area to the ROM area specification sections of two or more ones of the plurality of ROM area specification registers, the replacing unit can select one RAM area from among two or more RAM areas associated with the two or more ROM area specification registers according to the enable bits of the two or more ROM area specification registers so as to replace the identical ROM area with the selected RAM area.

Further objects and advantages of the present invention will be apparent from the following description of the preferred embodiments of the invention as illustrated in the accompanying drawings.

DETAILED DESCRIPTION OF THE PREFERRED EMBODIMENTS

First Embodiment

Figure 1:
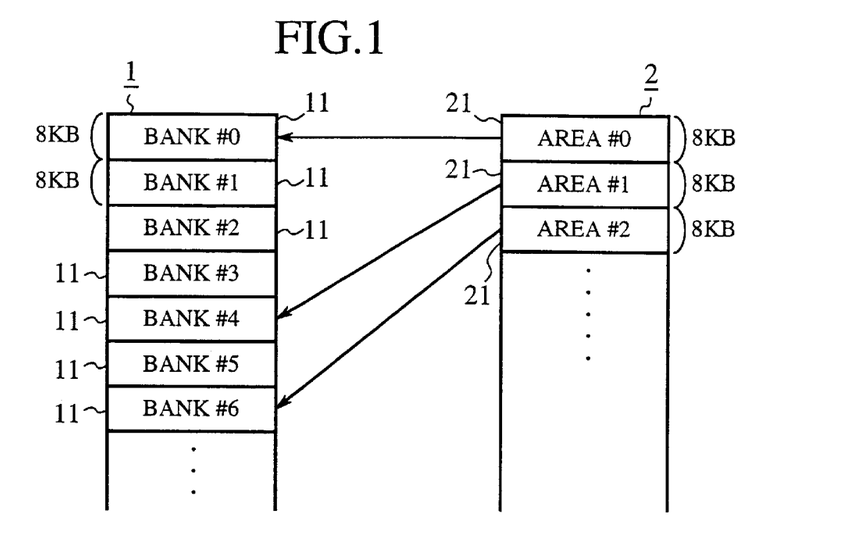
FIG. 1 is a diagram showing a concept underlying a microcomputer according to a first embodiment of the present invention.

Referring next to FIG. 1, there is illustrated a block diagram showing a concept underlying a microcomputer according to a first embodiment of the present invention. In the figure, reference numeral 1 denotes a ROM built in the microcomputer, and 2 denotes a RAM built in the microcomputer. The ROM 1 is divided into a plurality of ROM areas 11 each having a predetermined amount of storage in bytes, for example, 8KB. The plurality of ROM areas 11 are given bank numbers #0, #1, #2, . . . , respectively. The RAM 2 is also divided into a plurality of RAM areas 21, each having the same storage capacity as each of the plurality of ROM areas 11, for example, 8KB. The plurality of RAM areas 21 are also given area numbers #0, #1, #2, . . . , respectively.

Figure 2A:
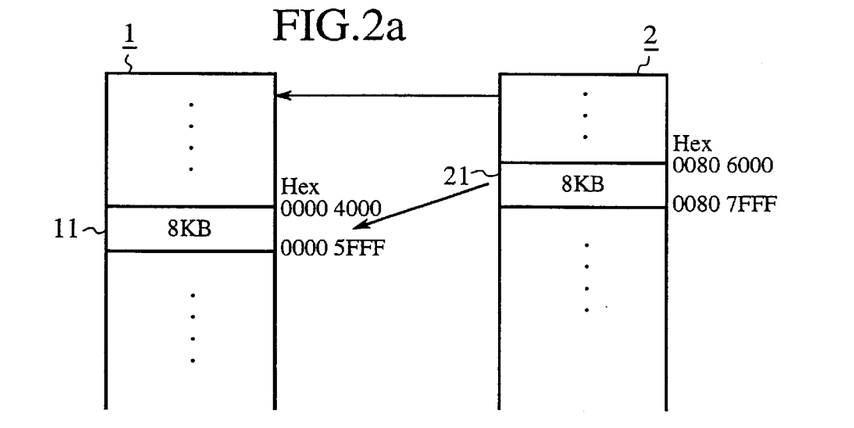
FIGS. 2a and 2b are diagrams showing address conversion performed when replacing a ROM area with a corresponding RAM area.
Figure 2B:
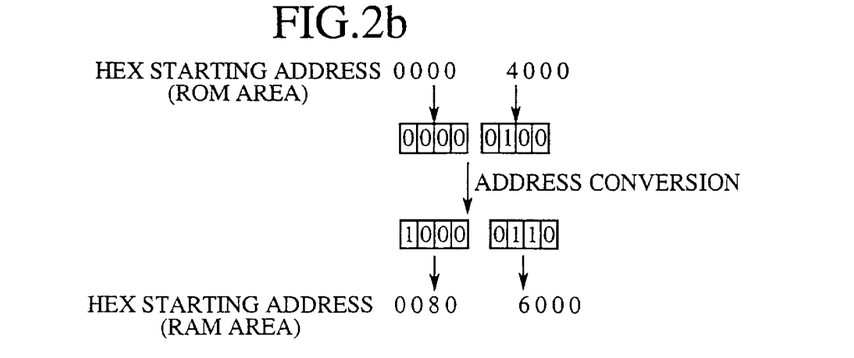

In operation, any one of the plurality of 8KB ROM areas 11 into which the ROM 1 is divided can be emulated using a corresponding one of the plurality of SKB RAM areas 21 into which the RAM 2 is divided. For example, in emulation mode, the 8KB ROM area 11 numbered #0 in the ROM 1 can be replaced with the 8KB RAM area 21 numbered #0 on the RAM 2, the 8KB ROM area 11 numbered #4 in the ROM 1 can be replaced with the BKB RAM area 21 numbered #1 in the RAM 2, and the 8KB ROM area 11 numbered #6 in the ROM 1 can be replaced with the 8KB RAM area 21 numbered #2 in the RAM 2, as shown in FIG. 1. The replacement can be performed by using an address decoder (not shown) built in the microcomputer. FIGS. 2a and 2b show address conversion performed by the address decoder when replacing a ROM area 11 with a corresponding RAM area 21. For example, when replacing a ROM area 11 located between hexadecimal or hex addresses 00004000 and 00005FFF with a RAM area 21 located between hex addresses 00806000 and 00807FFF, as shown in FIG. 2a, the address decoder (not shown) converts the starting address specifying the ROM area 11 to the corresponding starting address specifying the corresponding RAM area 21 by setting both the most significant bit in the third-leftmost hex digit and the second-least significant bit in the fourth-rightmost hex digit of the starting address specifying the ROM area 11 to 1, as shown in FIG. 2b. As a result, the corresponding RAM area 21 can be accessed in the emulation mode using the memory map of the ROM area 11 that is to be replaced with the RAM area 21 in which part of the program that needs to be debugged and tuned is stored.

Any one of the plurality of ROM areas 11 in the ROM 1 that needs to be replaced with one RAM area can be freely associated with any one of the plurality of RAM areas 21 in the RAM 2. In the example as shown in FIG. 1, when the ROM area 11 numbered #0 is accessed in the emulation mode, the RAM area 21 numbered #0 will be actually accessed, so that the emulation function is performed in the RAM area 21. Similarly, when the ROM area 11 numbered #4 is accessed in the emulation mode, the RAM area 21 numbered #1 will be actually accessed, so that the emulation function is performed in the RAM area 21. When the ROM area 11 numbered #6 is accessed in the emulation mode, the RAM area 21 numbered #2 will be actually accessed, so that the emulation function is performed in the RAM area 21. Every ROM area 11 in the ROM 1 can be replaced with any one of the plurality of RAM areas 21 in the RAM 2 and emulated using the corresponding RAM area 21. Thus the whole of any program in the ROM 1 can be debugged and tuned using this emulation function without having to reconfigure the program in the ROM 1.

In a variant of the preferred embodiment shown, the RAM 2 can have a plurality of RAM areas, each having a predetermined storage amount of 4KB, in addition to the plurality of 8KB RAM areas 21. In this case, the ROM 1 is a plurality of ROM areas each having a predetermined storage amount of 4KB, and each of the plurality of ROM areas can be replaced with any one of the plurality of 4KB RAM areas in the RAM 2.

Any RAM area with which one ROM area is to be replaced can also be accessed as RAM in the usual manner. In other words, either the address specifying one ROM area that is to be replaced with a corresponding RAM area or the address directly specifying the RAM area can be accessed.

As previously mentioned, in accordance with the first embodiment of the present invention, each of the plurality of ROM areas 11 each having a predetermined amount of storage into which the ROM 1 is divided can be replaced with any one of the plurality of RAM areas 21 each having the same storage amount as each of the plurality of ROM areas into which the RAM 2 is divided while each of the plurality of ROM areas 11 is freely associated with a different one of the plurality of RAM areas 21. Accordingly, the first embodiment offers the advantage of being able to access a corresponding RAM area 21 using the memory map of a ROM area 11 that is to be replaced with the corresponding RAM area 21 in which part of the program that needs to be debugged and tuned is stored. Thus, in accordance with the first embodiment of the present invention, there is provided a microcomputer in which fine program tuning can be carried out.

Second Embodiment

Figure 3:
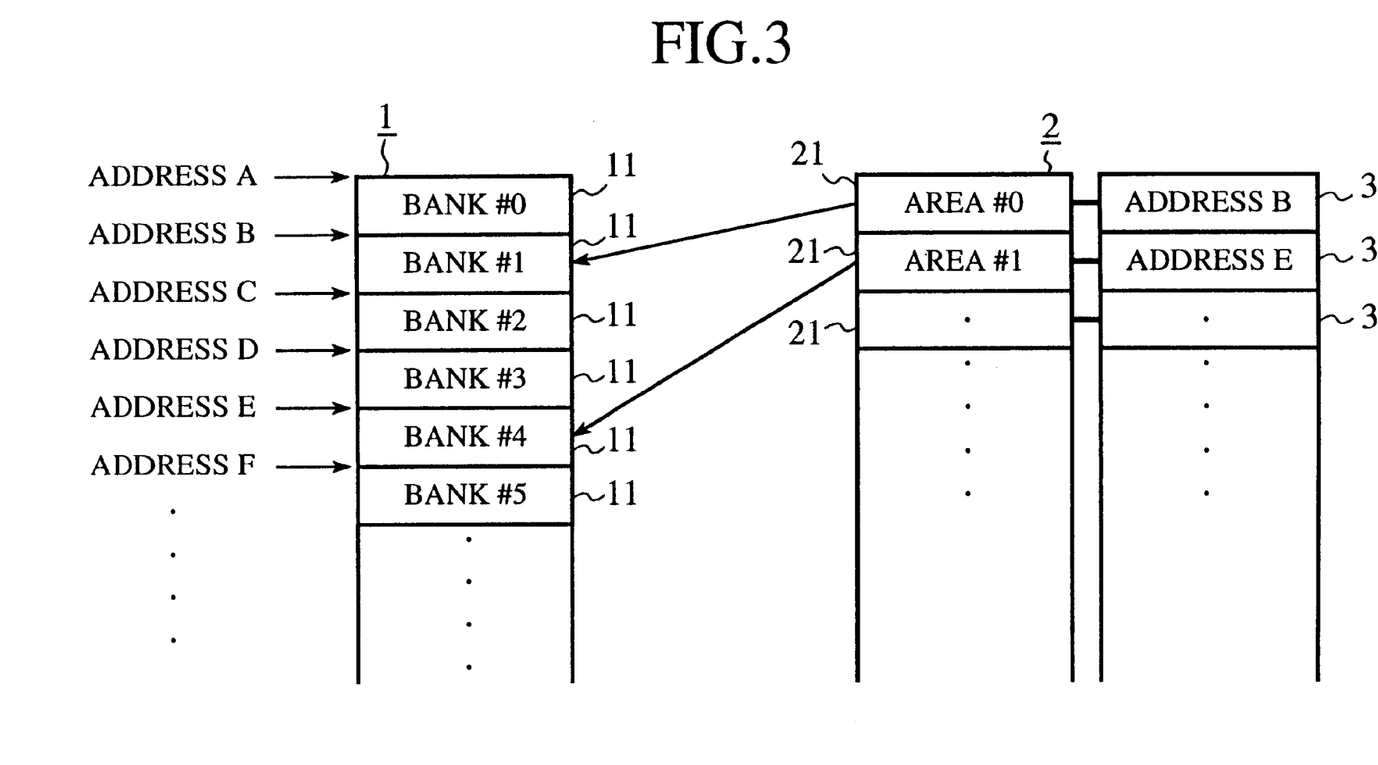
FIG. 3 is a diagram showing a concept underlying a microcomputer according to a second embodiment of the present invention.

Referring next to FIG. 3, there is illustrated a diagram showing a concept underlying a microcomputer according to a second embodiment of the present invention. In the figure, reference numeral 1 denotes a ROM built in the microcomputer, and 2 denotes a RAM built in the microcomputer. The ROM 1 is divided into a plurality of ROM areas 11 that are given bank numbers #0, #1, #2, . . . , respectively. The RAM 2 is also divided into a plurality of RAM areas 21 that are given area numbers #0, #1, #2, . . . , respectively. The plurality of ROM areas 11 have respective starting addresses A, B, C, . . . In FIG. 3, reference numeral 3 denotes each of a plurality of ROM area specification registers, which is associated with each of the plurality of RAM areas 21 in the RAM 2, for holding the starting address specifying a corresponding one of the plurality of ROM areas 11 that is to be replaced with each of the plurality of RAM areas 21, so as to assign each of the plurality of RAM areas 21 to at least the corresponding ROM area. The plurality of components shown in FIG. 3, except the plurality of ROM area specification registers 3, are the same as those of the microcomputer according to the first embodiment, which are designated by the same reference numerals as shown in FIG. 1.

In operation, when any one of the plurality of ROM areas 11 in the ROM 1 is emulated using a corresponding one of the plurality of RAM areas 21 in the RAM 2, the starting address specifying the corresponding ROM area 11 that is to be replaced with any one of the plurality of RAM areas 21 is written into each of the plurality of ROM area specification registers 3 associated with each of the plurality of RAM areas 21. In the example as shown in FIG. 3, the starting address B of the ROM area 11 numbered #1 is written into the ROM area specification register 3 associated with the RAM area 21 numbered #0 and the starting address E of the ROM area 11 numbered #4 is written into the ROM area specification register 3 associated with the RAM area 21 numbered #1 so that the ROM area 11 numbered #1 in the ROM 1 can be replaced with the RAM area 21 numbered #0 in the RAM 2 and the ROM area 11 numbered #4 in the ROM 1 can be replaced with the RAM area 21 numbered #1 in the RAM 2.

When such starting addresses are written into the plurality of ROM area specification registers 3, respectively, all ROM areas 11 in the ROM 1 specified by the respective starting addresses stored in the plurality of ROM area specification registers 3 can be replaced with corresponding ones of the plurality of RAM areas 21 respectively associated with the plurality of ROM specification registers 3. In the example as shown in FIG. 3, the ROM area 11 numbered #1 in the ROM 1 can be replaced with the RAM area 21 numbered #0 in the RAM 2 and the ROM area 11 numbered #4 in the ROM 1 can be replaced with the RAM area 21 numbered #1 in the RAM 2. When the ROM area 11 numbered #1 is accessed in the emulation mode, the RAM area 21 numbered #0 will be actually accessed. Similarly, when 15 the ROM area 11 numbered #4 is accessed in the emulation mode, the RAM area 21 numbered #1 will be actually accessed. The program in the ROM 1 can thus be debugged and tuned.

As previously mentioned, in accordance with the second embodiment of the present invention, the starting address specifying one ROM area 11 that is to replaced with a corresponding RAM area 21 is written into each of the plurality of ROM area specification registers 3 while each of the plurality of RAM areas 21 in the RAM 2 is associated with a different one of the plurality of ROM areas 11 in the ROM 1, which is specified by each of the plurality of ROM area specification registers 3. Accordingly, the second embodiment offers the advantage of being able to easily replace any ROM area 11 in the ROM 1 with a corresponding RAM area 21 associated with the ROM area 11.

Third Embodiment

Figure 4:
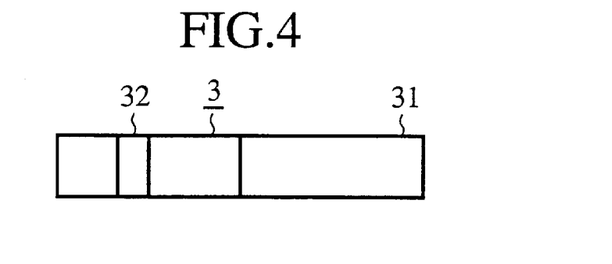
FIG. 4 is a diagram showing the structure of a ROM area specification register for use with a microcomputer according to a third embodiment of the present invention.

In accordance with a third embodiment of the present invention, there is provided a microcomputer having a function of enabling or disabling the emulation function to be performed in each of a plurality of ROM areas 11 in a ROM 1 in emulation mode in addition to the structure of the microcomputer according to the second embodiment mentioned above. Referring next to FIG. 4, there is illustrated a diagram showing a ROM area specification register for use in the microcomputer according to the third embodiment of the present invention. Like the second embodiment, each of the plurality of ROM areas 11 in the ROM 1 can be associated with a different one of a plurality of RAM areas 21 in a RAM 2. As shown in FIG. 4, each of the plurality of ROM area specification registers 3 associated with each of the plurality of RAM areas 21 into which the RAM 2 is divided as shown in FIG. 3 includes a ROM area specification section 31 into which the starting address specifying a corresponding ROM area 11 is stored, and an enable bit for selectively enabling or disabling the process of replacing the corresponding ROM area 11 specified by the ROM area specification section 31 with each of the plurality of RAM areas 21 associated with each of the plurality of ROM area specification registers 3, as well as enabling or disabling the specification of the corresponding ROM area 11 by the ROM area specification section 31.

In operation, the starting address specifying one ROM area 11 that is to be replaced with each of the plurality of RAM areas 21 is preset to the ROM area specification section 31 in each of the plurality of ROM area specification registers 3 associated with each of the plurality of RAM areas 21 in the RAM 2. In order to replace one ROM area 11 specified by the ROM area specification section 31 of a corresponding ROM area specification register 3 with a corresponding RAM area 21 associated with the ROM area specification register 3 in the emulation mode, the enable bit 32 of the ROM area specification register 3 is set to "1". Thus, the specification of the ROM area 11 by the ROM area specification section 31 of the ROM area specification register 3 and the replacement of the ROM area 11 specified by the ROM area specification section 31 with the RAM area 21 associated with the ROM area specification register 3 are enabled in the emulation mode. After that, the emulation function is performed in the same manner as that of the second embodiment, so that the debugging and tuning of the program in the ROM can be carried out.

In order not to replace one ROM area 11 in the ROM 1, which is specified by the ROM area specification section 31 of a corresponding ROM area specification register 3, with a corresponding RAM area 21 associated with the ROM area specification register 3 in the emulation mode, the enable bit 32 of the ROM area specification register 3 is set to "0". Thus, the specification of the ROM area 11 by the ROM area specification section 31 of the ROM area specification register 3 and the replacement of the ROM area 11 specified by the ROM area specification section 31 with the RAM area 21 associated with the ROM area specification register 3 are disabled in the emulation mode. After that, no emulation function is performed on any ROM area 11 associated with one ROM area specification register 3 whose enable bit is set to "0" using a corresponding one of the plurality of RAM areas 21 in the RAM 2.

As previously explained, in accordance with the third embodiment of the present invention, each of the plurality of ROM area specification registers 3 includes the enable bit 32 for enabling or disabling the specification of a corresponding ROM area 11 by the ROM area specification section 31 of each of the plurality of ROM area specification registers 3 and the replacement of the corresponding ROM area 11 specified by the ROM area specification section 31 with a corresponding RAM area 21 associated with each of the plurality of ROM area specification registers 3 in the emulation mode. The switching between enabling the process of replacing any ROM area 11 with a corresponding RAM area 21 and disabling the process can be freely done by writing the starting address on the ROM area specification section 31 of a corresponding ROM area specification register 3 in advance and by changing the value of the enable bit of the ROM area specification register 3. The tuning of the program in the ROM is thus carried out effectively.

Fourth Embodiment

Figure 5:
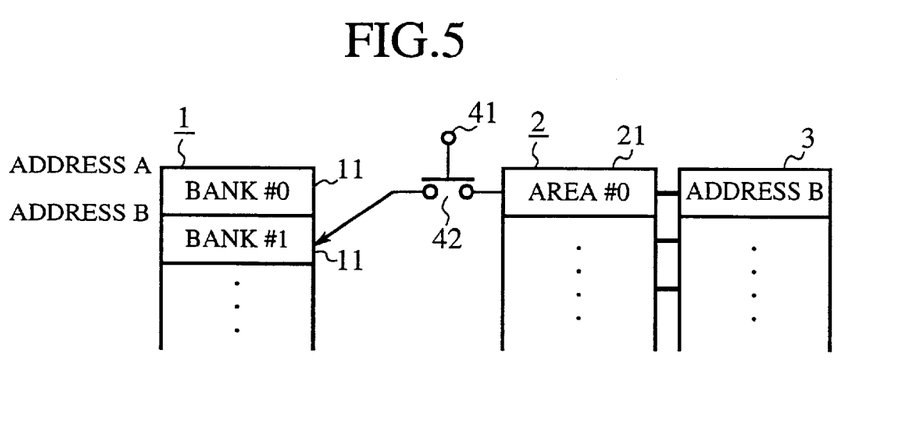
FIG. 5 is a diagram showing a concept underlying a microcomputer according to a fourth embodiment of the present invention.

In accordance with a fourth embodiment, there is provided a microcomputer capable of enabling or disabling the emulation function to be performed on each of a plurality of ROM areas 11 in the emulation mode in response to the level of a control signal applied to a corresponding external terminal, instead of using the enable bit 32 of a corresponding ROM area specification register. Referring next to FIG. 5, there is illustrated a diagram showing a concept underlying the microcomputer according to the fourth embodiment of the present invention. In the figure, reference numeral 41 denotes an external terminal to which a control signal for enabling or disabling both the specification of a corresponding ROM area 11 by the ROM area specification section 31 of a corresponding ROM area specification register 3 and the replacement of the ROM area 11 specified by the ROM area specification section 31 with one RAM area 21 associated with the ROM area specification register 3, and 42 denotes a switch that is turned on or off in response to the control signal applied to the external terminal 41. When each switch 42 is turned on, it connects a corresponding ROM area 11 whose starting address is written in a corresponding ROM area specification register 3 with one RAM area 21 associated with the ROM specification register 3 so as to replace the ROM area 11 with the RAM area 21. Each switch 42 is associated with each of the plurality RAM areas 21 in the RAM 2.

Assume that the starting address B of the ROM area 11 numbered #1 in the ROM 1 is written into the ROM area specification area 3 associated with the RAM area 21 numbered #0 in the RAM 2, as shown in FIG. 5. In order to enable the specification of the ROM area 11 numbered #1 by the ROM area specification register 3 and the replacement of the ROM area 11 with the RAM area 21 numbered #0 associated with the ROM area specification register 3, the external terminal 41 is brought to a high level and therefore the corresponding switch 42 is turned on. Thus the specification of the ROM area 11 by the ROM area specification section 31 of the ROM area specification register 3 and the replacement of the ROM area 11 specified by the ROM area specification section 31 with the RAM area 21 associated with the ROM area specification register 3 are enabled in the emulation mode. The ROM area 11 numbered #1 can be replaced with the RAM area 21 numbered #0 in the emulation mode. After that, the debugging and tuning of the program on the ROM 1 can carried out.

In order not to replace a ROM area 11 in the ROM 1, which is specified by the ROM area specification section 31 of a corresponding ROM area specification register 3, with a corresponding RAM area 21 associated with the ROM area specification register 3 in the emulation mode, a corresponding external terminal 41 is brought to a low level and therefore a corresponding switch 42 is turned off. Thus, the specification of the ROM area 11 by the ROM area specification section 31 of the ROM area specification register 3 and the replacement of the ROM area 11 specified by the ROM area specification section 31 with the RAM area 21 associated with the ROM area specification register 3 are disabled in the emulation mode. After that, no emulation function is performed on any ROM area 11 associated with one external terminal whose level is low, using a corresponding one of the plurality of RAM areas 21 in the RAM 2.

As previously mentioned, the microcomputer of the fourth embodiment includes the plurality of ROM area specification registers 3 respectively associated with the plurality of RAM areas 21 in the RAM 2, into which addresses specifying respective ROM areas 11 in the ROM 1 that are to be replaced with the plurality of RAM areas 21 are written in advance. However, the concept underlying the microcomputer of the fourth embodiment can be applied to the microcomputer according to the first embodiment without any ROM area specification register 3.

As previously explained, in accordance with the fourth embodiment of the present invention, the switching between enabling the process of replacing any ROM area 11 with a corresponding RAM area 21 and disabling the process can be done by changing the level of a control signal applied to a corresponding external terminal 41 without having to use software. Accordingly, the fourth embodiment offers the advantage of being able to reduce the load on software.

Fifth Embodiment

Figure 6:
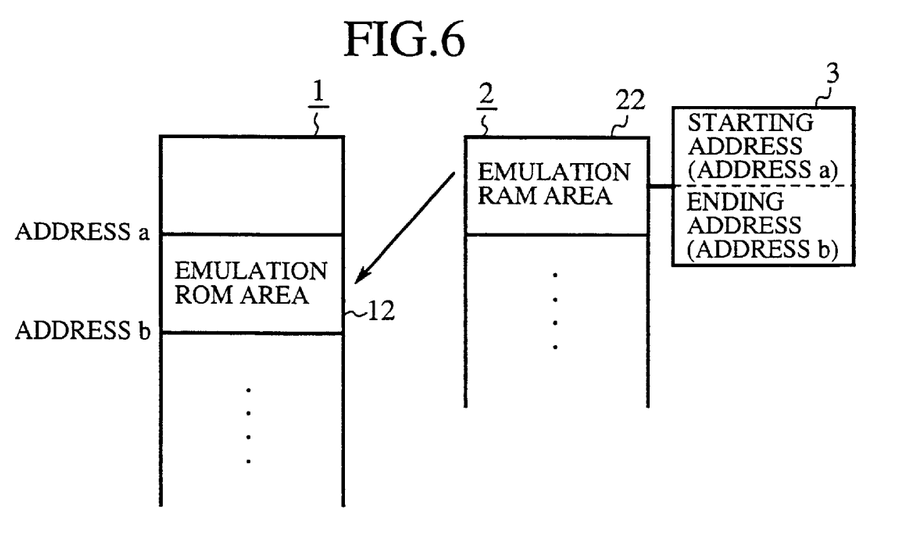
FIG. 6 is a diagram showing a concept underlying a microcomputer according to a fifth embodiment of the present invention.

In accordance with a fifth embodiment of the present invention, there is provided a microcomputer that can set the starting and ending addresses of a corresponding ROM area that is to be replaced with a RAM area into each of a plurality of ROM area specification registers 3. Referring next to FIG. 6, there is illustrated a diagram showing a concept underlying the microcomputer of the fifth embodiment of the present invention. In the figure, reference numeral 1 denotes a ROM, 12 denotes an emulation ROM area having an arbitrary size or storage capacity in the ROM 1 and on which emulation can be performed, 2 denotes a RAM, 22 denotes an emulation RAM area having the same size, i.e., storage capacity as the emulation ROM area 12, and 3 denotes a ROM area specification register associated with the emulation RAM area 22. The ROM area specification register 3 differs from one ROM area specification register 3 according to any one of the second to fourth embodiments mentioned above in that the ROM area specification register 3 of the fifth embodiment stores the ending address specifying the end of the emulation ROM area 12 as well as the starting address specifying the top of the emulation ROM area 12.

In operation, when performing the emulation operation on the emulation ROM area 12 located at address a to b in the ROM 1, the starting address (i.e., address a) and the ending address (i.e., address b) of the emulation ROM area 12 are written into the ROM area specification register 3 first. As a result, the emulation ROM area 12 in the ROM 1 can be replaced with the emulation RAM area 22 in the RAM in emulation mode. In other words, the microcomputer of the fifth embodiment of the present invention can freely define one or more emulation ROM areas 12 in the ROM 2 by writing the starting and ending addresses of each of the one or more emulation ROM areas 12 into each of a plurality of ROM area specification registers 3, and replace each of the plurality of emulation ROM areas 12 located between the starting address and the ending address with a corresponding emulation RAM area 22 allocated in the RAM 2, instead of replacing one predetermined ROM area fixed in the ROM with a corresponding RAM area in the RAM 2. After that, the tuning of the program on the ROM 1 can be carried out.

As previously explained, in accordance with the fifth embodiment of the present invention, the microcomputer can freely define one or more ROM areas having an arbitrary size (e.g., an emulation ROM area 12) in each of which emulation can be performed in the ROM 2 by writing the starting and ending addresses of each of the plurality of ROM areas into each of the plurality of ROM area specification registers 3. The microcomputer can thus replace each ROM area (e.g., the emulation ROM area 12) located between the starting address and the ending address with a corresponding RAM area (e.g., an emulation RAM area 22) formed in the RAM 2 with efficiency. Accordingly, the fifth embodiment offers advantage of being able to easily tune the program on the ROM.

Sixth Embodiment

Figure 7:
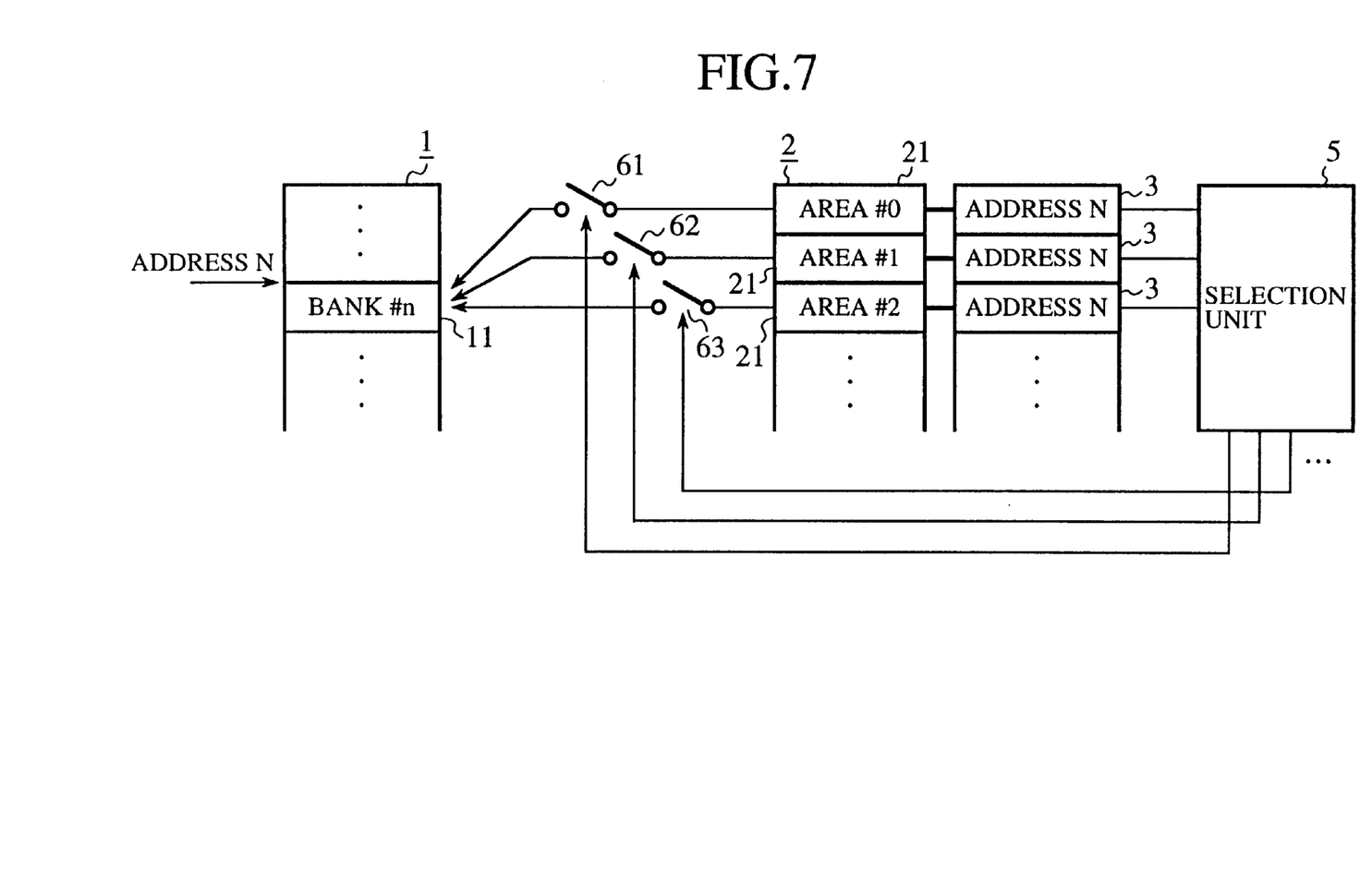
FIG. 7 is a diagram showing a concept underlying a microcomputer according to a sixth embodiment of the present invention.

In the microcomputer of the above-mentioned second embodiment, the plurality of ROM area specification registers 3 can assign the plurality of RAM areas 21 in the RAM 2 to different ROM areas 11, respectively. In contrast, a microcomputer according to a sixth embodiment of the present invention can set the same starting address specifying an identical ROM area 11 to two or more ROM area specification registers 3, and replace the ROM area with any one of two or more RAM areas 21 associated with the two or more ROM area specification registers 3. Referring next to FIG. 7, there is illustrated a diagram showing a concept underlying the microcomputer according to the sixth embodiment of the present invention. In the figure, reference 1 denotes a ROM, 2 denotes a RAM, 11 denotes a ROM area formed in the ROM 1 whose bank number is #n and whose starting address is N, 21 denotes a RAM area formed in the RAM 2, whose area number is #0, #1, or #2, and which is formed in the RAM 2, and 3 denotes a ROM area specification register associated with a corresponding RAM area 21 numbered #0, #1, or #2. Each of the three ROM area specification registers 3 holds the starting address N of the ROM area 11 whose bank number is #n, in the example of FIG. 7. In addition, reference numeral 5 denotes a selection unit for selecting one RAM area from among the plurality of RAM areas 21 associated with the plurality of ROM area specification registers 3 according to priorities assigned to the plurality of RAM areas 21 when the same starting address is written in the plurality of ROM area specification registers 3, as shown in the figure, and 61, 62, and 63 denote enable switches, each of which can be turned off when receiving an output at state 0 of the selection unit 5, respectively.

I is preferable that the selection unit 5 can assign priorities decreasing in ascending order of area numbers to the plurality of RAM areas 21 whose area numbers are #0, #1, and #2, i.e., the one assigned to area number #0>the one assigned to area number #1> the one assigned to area number #2>..., and select one RAM area 21 that can take the place of the corresponking ROM area 11 specified by the plurality of RAM areas 21 numbered #0, #1, and #2 from among them.

The selection unit 5 determines whether two or more ROM area specification registers 3 have the same starting address specifying the same ROM area 11 by comparing contents among the plurality of ROM specifying areas 3. When the starting address N specifying the same ROM area 11 is written in the three ROM area specification registers 3 associated with the three RAM areas 21 numbered #0, #1, and #2, as shown in FIG. 7, the selection unit 5 generates and furnishes an output at state 1 only to the first enable switch 61, and also generates and furnishes another output at state 0 to the second and third enable switches 62 and 63. As a result, only the first switch 61 is turned on while the other switches 62 and 63 are turned 25 off. When only the first switch 61 is turned on, the ROM area 11 whose bank number is #n and whose starting address is N can be replaced with the RAM area 21 numbered #0 and specified by the corresponding ROM area specification register 3, which has been selected by the selection unit 5.

The ROM area 11 numbered #n cannot be replaced with either of the other RAM areas 21 numbered #1 and #2 and associated with the other respective ROM area specification registers 3 having the same starting address N, because both the second and third enable switches 62 and 63 are turned off. Consequently, the ROM area 11 whose bank number is #n and whose starting address is N can be replaced with the RAM area 21 numbered #0 with the highest priority. After that, the program on the ROM 1 can be debugged and tuned.

When only the two ROM area specification registers 3 respectively associated with the two RAM areas 21 numbered #1 and #2 have the same starting address specifying the same ROM area 11 on the ROM 1, the selection unit 5 generates and furnishes an output at state 1 to the second enable switch 62, and also generates and furnishes another output at state 0 to the third enable switch 63. Consequently, the ROM area 11 whose bank number is #n and whose starting address is N can be replaced with the RAM area 21 numbered #1 with the highest priority. After that, the program on the ROM 1 can be debugged and tuned.

As previously mentioned, in accordance with the sixth embodiment of the present invention, when the same starting address specifying an identical ROM area 11 is written into two or more ROM area specification registers 3, the selection unit 5 can select one RAM area 21 that will take the place of the ROM area 11 from among two or more RAM areas 21 associated with the two or more ROM area specification registers 3 according to priorities assigned to the two or more RAM areas 21. Accordingly, even when the same ROM area 11 is specified by two or more ROM area specification registers 3, the microcomputer according to the sixth embodiment of the present invention can determine only one RAM area 21 that will take the place of the ROM area 11 according to priorities assigned to two or more RAM areas associated with the two or more ROM area specification registers 3 storing the same starting address specifying the same ROM area, thus preventing tuning data (i.e. the contents of the RAM 2) from being broken by coding errors.

Seventh Embodiment

Figure 8:
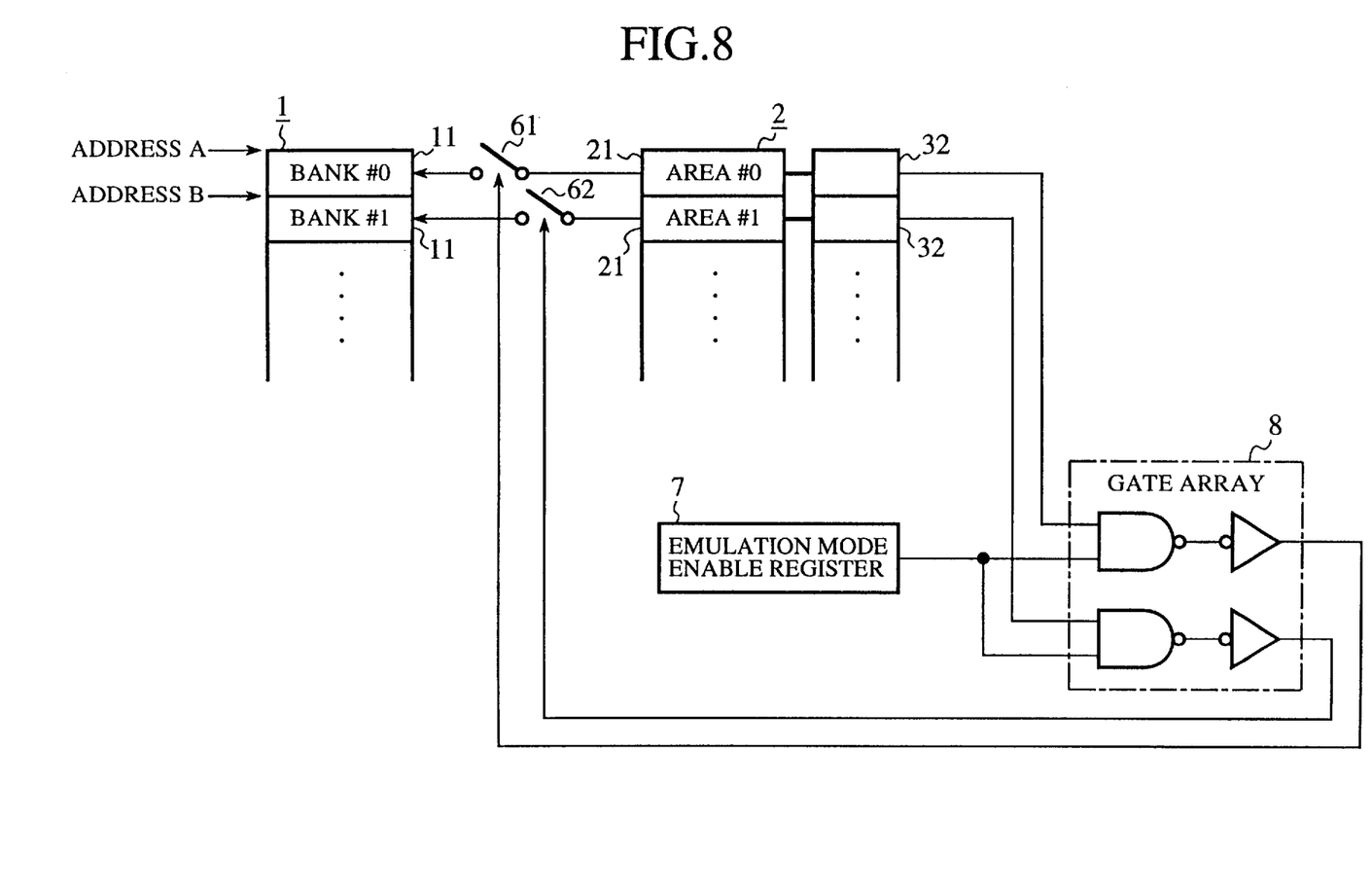
FIG. 8 is a diagram showing a concept underlying a microcomputer according to a seventh embodiment of the present invention.

In accordance with a seventh embodiment of the present invention, there is provided a microcomputer that can selectively enable or disable the overall emulation function using a RAM 2 in addition to selectively enabling or disabling the individual emulation function using each of a plurality of RAM areas according to the enable bit 3 of each of a plurality of ROM area specification registers 3, so that the selection between enabling and disabling the overall emulation function takes precedence over the selection between enabling and disabling the individual emulation function using each of the plurality of RAM areas. Referring next to FIG. 8, there is illustrated a diagram showing a concept underlying the microcomputer of the seventh embodiment of the present invention. In the figure, reference numeral 1 denotes a ROM, 2 denotes a RAM, 11 denotes each of a plurality of ROM areas into which the ROM 1 is divided, 21 denotes each of a plurality of RAM areas into which the RAM 2 is divided, and 32 denotes an enable bit included in each of a plurality of ROM area specification registers (not shown) respectively associated with the plurality of RAM areas 21 on the RAM 2, for selectively enabling or disabling the individual emulation function using each of the plurality of RAM areas 21.

In addition, reference numeral 7 denotes an emulation mode enable register including a selection bit for selectively enabling or disabling the overall emulation function using the RAM 2. The selection between enabling or disabling the overall emulation function takes precedence over the selection between enabling and disabling the individual emulation function using each of the plurality of RAM areas 21.

Reference numeral 8 denotes a gate array for passing the contents of the plurality of enable bits of the plurality of ROM area specification registers 3 only when the emulation mode enable register 7 indicates that the overall emulation function is enabled. The gate array 8 can be implemented via a plurality of AND gates, each AND gate implementing the logical AND operation on the selection bit of the emulation mode enable register 7 and each of the plurality of enable bits 32. Furthermore, 61 and 62 denote enable switches each of which is turned on in response to an output at state 1 from the gate array 8, or is turned off in response to an output at state 0 from the gate array 8, to connect or disconnect a corresponding RAM area with or from a corresponding ROM area, so that the individual emulation function using each of the plurality of RAM areas is enabled or disabled.

In operation, when replacing the ROM area whose starting address is A and whose bank number is #0 with the RAM area 21 numbered #0 and replacing the ROM area whose starting address is B and whose bank number is #1 with the RAM area 21 numbered #1, the microcomputer sets the selection bit of the emulation mode enable register 7 to "1" as well as sets the enable bits 32 of the corresponding ROM area specification registers associated with the RAM areas 21 numbered #0 and #1 to "1". When the selection bit of the emulation mode enable register 7 is set to "1", the contents of each of the plurality of ROM area specification registers 3 is furnished by way of the gate array 8, just as they are. As a result, the two outputs of the gate array 8 go state "1" in this case. When the two outputs of the gate array 8 become state "1", the enable switches 61 and 62 are turned on, and therefore, the ROM area 11 whose bank number is #0 can be replaced with the RAM area 21 numbered #0 and the ROM area 11 whose bank number is #1 can be replaced with the RAM area 21 numbered #1.

When preventing the microcomputer from replacing any ROM area 11 with a corresponding RAM area 21, that is, disabling the overall emulation function using the RAM 2, regardless of whether or not the enable bit 32 of each of the ROM area specification registers 3 is set to "1", the selection bit of the emulation mode enable register 7 is set to "0". When the selection bit of the emulation mode enable register 7 is set to "0", all outputs of the gate array 8 go state 0 regardless of the contents of each of the plurality of enable bits 32 of the plurality of ROM area specification registers. As a result, the enable switches 61 and 62 shown in the figure are turned off, and therefore, the ROM area 11 whose bank number is #0 cannot be replaced with the RAM area 21 numbered #0 and the ROM area 11 whose bank number is #1 cannot be replaced with the RAM area 21 numbered #1.

As previously explained, in accordance with the seventh embodiment of the present invention, the microcomputer can make the selection between enabling and disabling the overall emulation function using the RAM take precedence over the selection between enabling and disabling each of the individual emulation functions using each of the plurality of RAM areas 21. Accordingly, the seventh embodiment offers the advantage of being able to prevent unnecessary entries into the emulation mode by setting the selection bit of the emulation mode enable register 7 to "0" even if a wrong setting of the enable bit 32 of any ROM area specification register is done due to the out-of-control emulation program.

Eighth Embodiment

Figure 9:
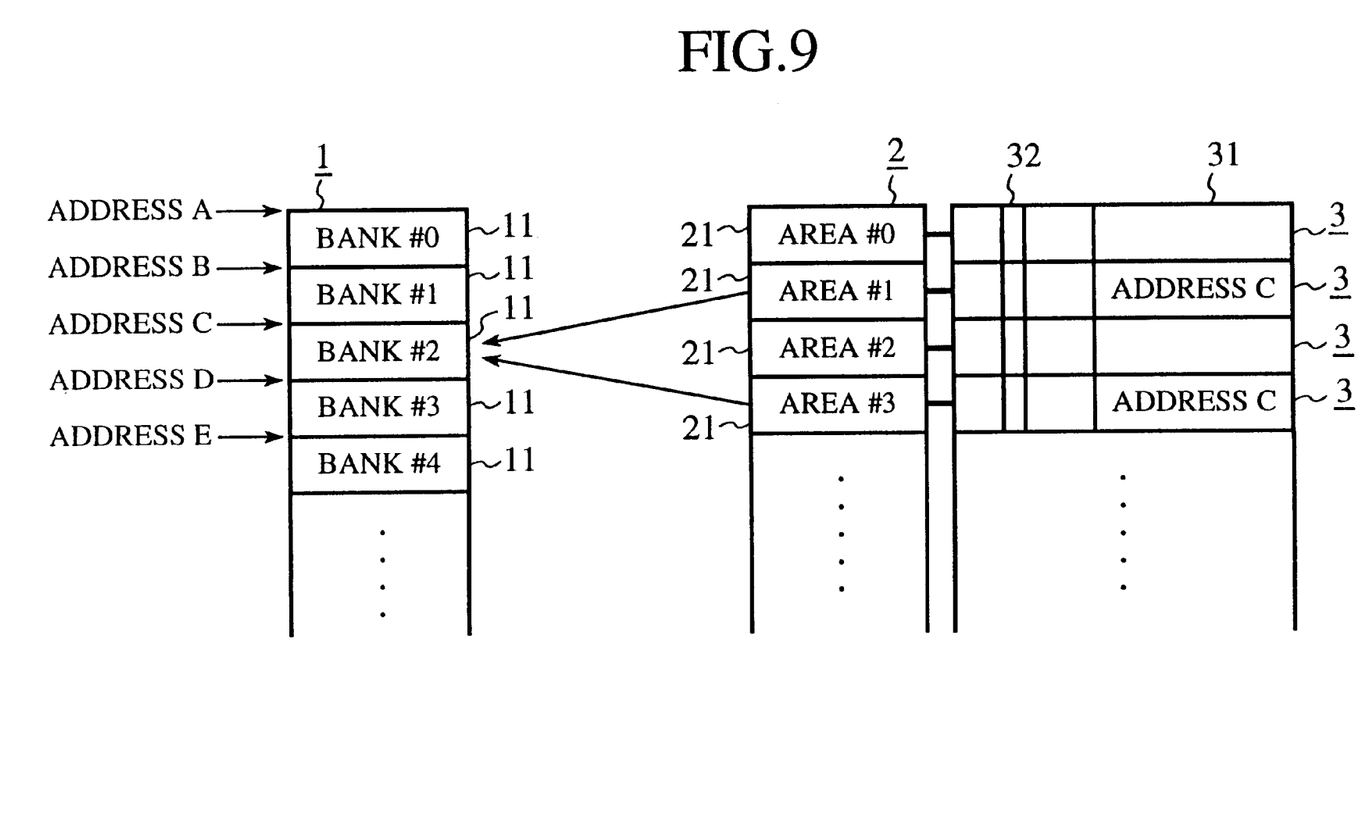
FIG. 9 is a diagram showing a concept underlying a microcomputer according to an eighth embodiment of the present invention.

As compared with the microcomputer of the above-mentioned sixth embodiment that can set the same starting address specifying the same ROM area 11 to two or more ROM area specification registers 3, select one RAM area with the highest priority from among two or more RAM areas 21 associated with the two or ROM specification registers 3 by means of the selection unit 5, and then replace the ROM area 11 with the selected RAM area 21 with the highest priority, a microcomputer according to an eighth embodiment of the present invention can select one RAM area 21 from among the two or more RAM areas 21 associated with the same ROM area 11 according to the contents of the plurality of enable bits of the two or more ROM area specification registers 3, instead of using the selection circuit 5 of the sixth embodiment. Referring next to FIG. 9, there is illustrated a diagram showing a concept underlying the microcomputer according to the eighth embodiment of the present invention. The microcomputer of the eighth embodiment thus does not include the selection unit 5. In the figure, reference numeral 1 denotes a ROM, 11 denotes each of a plurality of ROM areas into which the ROM 1 is divided, 2 denotes a RAM, 21 denotes each of a plurality of RAM areas into which the RAM 2 is divided, 3 denotes each of a plurality of ROM area specification registers associated with the plurality of RAM areas 21, respectively, 31 denotes a ROM area specifying section included in each of the plurality of ROM area specification registers 3, and 32 denotes an enable bit included in each of the plurality of ROM area specification registers 3.

In the example of FIG. 9, the same starting address C specifying an identical ROM area 11 numbered #2 in the ROM 1 is intentionally written into the ROM area specifying sections 31 of two ROM area specification registers 3 associated with two RAM areas 21 numbered #1 and #3. In this situation, either one of the two ROM area specification registers 31 whose ROM area specifying section 31 stores the same starting address specifying the same ROM area 11, for example, the ROM area specification register 31 associated with the RAM area 21 numbered #1 can be selected, and the enable bit 32 of the selected ROM area specification register 31 can be set to "1" while the enable bit 32 of the other ROM area specification register 31 associated with the RAM area 21 numbered #3 can be set to "0". As a result, the ROM area 11 specified by the ROM area specifying sections 31 of the two ROM area specification registers 3 can be replaced with only the RAM area 21 numbered #1 and associated with the selected ROM area specification register 3 whose enable bit 32 is set to "1".

In contrast, when the ROM area specification register 3 associated with the RAM area 21 numbered #3 is selected, the enable bit 32 of the selected ROM area specification register 3 can be set to "1" while the enable bit 32 of the other ROM area specification register 31 associated with the RAM area 21 numbered #1 can be set to "0". As a result, the ROM area 11 specified by the ROM area specifying sections 31 of the two ROM area specification registers 3 can be replaced with only the RAM area 21 numbered #3 and associated with the selected ROM area specification register 3 whose enable bit 32 is set to "1". In this manner, the microcomputer can assign two or more RAM areas 21 to an identical ROM area 11 and select one RAM area from among the two or more RAM areas 21 according to the enable bits 32 of two or more ROM area specification registers 3 associated with the two or more RAM areas 21. After that, the microcomputer can replace the ROM area 11 with one selected RAM area 21 and tune the program on the ROM 1.

As previously mentioned, in accordance with the eighth embodiment of the present invention, the microcomputer can assign a plurality of RAM areas 21 to an identical ROM area 11 and select one RAM area 21 among the plurality of RAM areas 21 according to the enable bits 32 of a plurality of ROM area specification registers 3 associated with the plurality of RAM areas 21. After that, the microcomputer can tune the program on the ROM 1 including a plurality of tuning data.

Many widely different embodiments of the present invention may be constructed without departing from the spirit and scope of the present invention. It should be understood that the present invention is not limited to the specific embodiments described in the specification, except as defined in the appended claims.

What is claimed is:

1. A microcomputer comprising:

a random access memory (RAM) including a plurality of RAM areas;

a read only memory (ROM) including a plurality of ROM areas that can be emulated by the RAM areas;

means for assigning at least one of the RAM areas to each of the ROM areas for emulation of the ROM areas;

means for replacing each of the ROM areas with a RAM area assigned to the ROM area for emulation of the ROM area, wherein the ROM areas are equal in storage capacity, and the RAM areas have the same storage capacity as the ROM areas; and a plurality of switches respectively associated with the RAM areas, each switch connecting and disconnecting a corresponding RAM area and the ROM area associated with the corresponding RAM area, in response to a control signal applied to an external terminal, wherein each of said plurality of switches is closed and opened respectively to enable and disable replacement of a ROM area with the corresponding RAM area.

2. The microcomputer according to claim 1, wherein said means for assigning includes a plurality of ROM area specification registers respectively associated with the RAM areas, each ROM area specification register specifying a ROM area that is to be replaced with a corresponding RAM area, and said means for replacing can replace a ROM area specified by the corresponding ROM area specification register with the corresponding RAM area.

3. A microcomputer comprising:

a random access memory (RAM) including a plurality of RAM areas;

a read only memory (ROM) including a plurality of ROM areas that can be emulated by the RAM areas;

means for assigning at least one of the RAM areas to each of the ROM areas for emulation of the ROM areas; and means for replacing each of the ROM areas with a RAM area assigned to the ROM area for emulation of the ROM area, wherein each of the plurality of ROM areas has an arbitrary storage capacity and a corresponding one of the plurality of RAM areas that is to replace each of the ROM areas has the same storage capacity as each of the ROM areas, and wherein said means for assigning includes a plurality of ROM area specification registers respectively associated with the RAM areas, each specification register storing a starting address and an ending address for specifying a ROM area that is to be replaced with the corresponding RAM area.

4. A microcomputer comprising:

a random access memory (RAM) including a plurality of RAM areas;

a read only memory (ROM) including a plurality of ROM areas that can be emulated by the RAM areas;

means for assigning at least one of the RAM areas to each of the ROM areas for emulation of the ROM areas;

means for replacing each of the ROM areas with a RAM area assigned to the ROM area for emulation of the ROM area, wherein the ROM areas are equal in storage capacity, and the RAM areas have the same storage capacity as the ROM areas, said means for assigning including a plurality of ROM area specification registers respectively associated with the RAM areas, each ROM area specification register specifying a ROM area that is to be replaced with a corresponding RAM area, and said means for replacing replacing a ROM area specified by the corresponding ROM area specification register with the corresponding RAM area; and means for, when said means for assigning indicates an identical ROM area for at least two of said plurality of ROM area specification registers, selecting one RAM area from among at least two RAM areas according to priorities assigned to the at least two RAM areas, and for connecting only the RAM area selected by said means for selecting for replacement of the ROM area.

5. A microcomputer comprising:

a random access memory (RAM) including a plurality of RAM areas;

a read only memory (ROM) including a plurality of ROM areas that can be emulated by the RAM areas;

means for assigning at least one of the RAM areas to each of the ROM areas for emulation of the ROM areas;

means for replacing each of the ROM areas with a RAM area assigned to the ROM area for emulation of the ROM area, wherein the ROM areas are equal in storage capacity, and the RAM areas have the same storage capacity as the ROM areas, said means for assigning including a plurality of ROM area specification registers respectively associated with the RAM areas, each ROM area specification register specifying a ROM area that is to be replaced with a corresponding RAM area, each of said plurality of ROM area specification registers including a ROM area specification section for specifying a ROM area that is to be replaced with a corresponding RAM area, and an enable bit for enabling and disabling replacement of the ROM area specified by said ROM area specification section with the corresponding RAM area, and said means for replacing replacing a ROM area specified by the corresponding ROM area specification register with the corresponding RAM area;

an emulation mode enable register for storing information for enabling and disabling an overall emulation function using said RAM;

a gate array for passing the enable bit of each of said plurality of ROM area specification registers only when information stored in said emulation mode enable register indicates that the overall emulation function is enabled; and a plurality of enable switches respectively associated with the plurality of RAM areas, each switch connecting and disconnecting a corresponding RAM area and the ROM area associated with the RAM area, in response to an output signal from said gate array.

6. A microcomputer comprising:

a random access memory (RAM) including a plurality of RAM areas;

a read only memory (ROM) including a plurality of ROM areas that can be emulated by the RAM areas;

means for assigning at least one of the RAM areas to each of the ROM areas for emulation of the ROM areas; and means for replacing each of the ROM areas with a RAM area assigned to the ROM area for emulation of the ROM area, wherein the ROM areas are equal in storage capacity, and the RAM areas have the same storage capacity as the ROM areas, said means for assigning including a plurality of ROM area specification registers respectively associated with the RAM areas, each ROM area specification register specifying a ROM area that is to be replaced with a corresponding RAM area, each of said plurality of ROM area specification registers including a ROM area specification section for specifying a ROM area that is to be replaced with a corresponding RAM area, and an enable bit for enabling and disabling replacement of the ROM area specified by said ROM area specification section with the corresponding RAM area, and said means for replacing replacing a ROM area specified by the corresponding ROM area specification register with the corresponding RAM area, wherein when said means for assigning indicates an identical ROM area to the ROM area specification sections of at least two of said ROM area specification registers, said means for replacing selects one RAM area from among the RAM areas associated with said at least two ROM area specification registers according to the enable bits of said at least two ROM area specification registers to replace the identical ROM area with the RAM area selected by said means for replacing.

* * * * *